United States Patent
Zajac et al.

(10) Patent No.: US 11,886,212 B2
(45) Date of Patent: Jan. 30, 2024

(54) PNEUMATIC VALVE WITH RUPTURABLE MEMBRANE

(71) Applicant: Goodrich Corporation, Charlotte, NC (US)

(72) Inventors: Piotr J. Zajac, Wroclaw (PL); Kamil Czechowski, Wroclaw (PL); Adrian Tarnowski, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 629 days.

(21) Appl. No.: 17/120,508

(22) Filed: Dec. 14, 2020

(65) Prior Publication Data

US 2021/0181770 A1    Jun. 17, 2021

(30) Foreign Application Priority Data

Dec. 13, 2019    (EP) .................................. 19461615

(51) Int. Cl.
*G05D 7/01*      (2006.01)
*B60C 29/00*      (2006.01)
(Continued)

(52) U.S. Cl.
CPC ......... *G05D 7/0193* (2013.01); *B60C 29/002* (2013.01); *F16K 13/04* (2013.01); *F16K 17/16* (2013.01); *Y10T 137/1774* (2015.04)

(58) Field of Classification Search
CPC .............. F16K 13/04; Y10T 137/1714; Y10T 137/1774; Y10T 137/8122; Y10T 137/86759; Y10T 137/86791
See application file for complete search history.

(56) References Cited

U.S. PATENT DOCUMENTS 1,779,056 A * 10/1930 Harris .................. F16K 17/16
                                                            137/613
1,863,455 A * 6/1932 Rowley .............. A62C 99/0027
                                                              169/26

(Continued)

FOREIGN PATENT DOCUMENTS

GB           372895 A      5/1932

OTHER PUBLICATIONS

European Search Report for Application No. 19461615.7, dated Jun. 4, 2020, 7 pages.

*Primary Examiner* — Robert K Arundale
(74) *Attorney, Agent, or Firm* — CANTOR COLBURN LLP

(57) ABSTRACT

A pneumatic valve for attachment to a source of high pressure gas comprises a valve body which comprises a gas inlet and a gas outlet. A rupturable membrane extends across the gas inlet. A membrane support element is slidably supported in the valve body for movement between an extended position and a retracted position, the membrane support element having a lower end engageable, in the extended position, with the rupturable membrane to support the rupturable membrane against rupture. The valve body further comprises a bore through which the membrane support element extends and one or more gas supply passages bypassing the bore for providing a gas flow path from the gas inlet to the gas outlet. The membrane support element is configured to be movable from the extended position to the retracted position to permit the rupturable membrane to rupture under the pressure of the high pressure gas.

16 Claims, 5 Drawing Sheets

(51) Int. Cl.
  *F16K 17/40*  (2006.01)
  *F16K 17/06*  (2006.01)
  *F16K 17/16*  (2006.01)

(56) References Cited

U.S. PATENT DOCUMENTS

| | | | |
|---|---|---|---|
| 1,874,356 A * | 8/1932 | Rowley | A62C 99/0027 |
| | | | 137/71 |
| 1,900,764 A * | 3/1933 | Rowley | A62C 99/0027 |
| | | | 169/26 |
| 2,684,180 A | 7/1954 | Allen | |
| 4,520,838 A * | 6/1985 | Fisher | F16K 13/04 |
| | | | 222/3 |
| 9,309,981 B2 * | 4/2016 | Porterfield | F16K 17/14 |
| 2002/0017319 A1 * | 2/2002 | Hintzman | F16K 31/56 |
| | | | 137/71 |
| 2010/0127195 A1 | 5/2010 | Mclelland et al. | |
| 2011/0008739 A1 | 1/2011 | Mungas et al. | |
| 2013/0255971 A1 | 10/2013 | Ehlers et al. | |
| 2014/0263030 A1 | 9/2014 | Weller | |
| 2016/0102774 A1 | 4/2016 | Smith et al. | |
| 2018/0142533 A1 | 5/2018 | Joerpeland et al. | |

* cited by examiner

PNEUMATIC VALVE WITH RUPTURABLE MEMBRANE

FOREIGN PRIORITY

This application claims priority to European Patent Application No. 19461615.7 filed Dec. 13, 2019, the entire contents of which is incorporated herein by reference.

TECHNICAL FIELD

The present disclosure relates to a pneumatic valve, and in particular to a pneumatic valve having a rupturable membrane. Such valves may be used, for example, as inflation valves in inflation systems.

BACKGROUND

Pneumatic inflation valves are used in inflation systems that need to be inflated rapidly, such as those used in aircraft evacuation slides, inflatable dinghies and so on. The valve has a membrane which is ruptured to release high pressure inflating gas from a high pressure source into an inflation system. In some systems, the membrane is supported against rupture by a valve element which is released in order to allow the membrane to be ruptured by the pressure of gas from the inflation source. It is desirable that the ruptured membrane does not interfere with the supply of inflation gas to the device to be inflated. The present disclosure seeks to provide a pneumatic valve which mitigates this problem.

SUMMARY

From a first aspect, the disclosure provides a pneumatic valve for attachment to a source of high pressure gas. The pneumatic valve comprises a valve body which comprises a gas inlet and a gas outlet. A rupturable membrane extends across the gas inlet. A membrane support element is slidably supported in the valve body for movement between an extended position and a retracted position. The membrane support element has a lower end which is engageable, in the extended position, with the rupturable membrane to support the rupturable membrane against rupture. The valve body further comprises a bore through which the membrane support element extends and one or more gas supply passages bypassing the bore for providing a gas flow path from the gas inlet to the gas outlet. The membrane support element is configured to be movable from the extended position to the retracted position to permit the rupturable membrane to rupture under the pressure of the high pressure gas. The lower end of the membrane support element in the retracted position is positioned within the bore whereby the lower end of the membrane support element and the bore together form a pocket for receiving a ruptured portion of the rupturable membrane.

In embodiments of the above, the valve body may comprise a plurality of gas supply passages arranged around the bore. Optionally the gas supply passages may be circumferentially equi-spaced about the bore.

In embodiments of any of the above, the total cross sectional flow area of the at least one gas passage may be greater than the cross sectional flow area of the gas inlet. This reduces the possibility of the gas passage restricting flow from the gas inlet to the gas outlet.

In embodiments of any of the above, the valve body may comprise an inlet chamber in fluid communication with the gas inlet and an outlet chamber in fluid communication with the gas outlet, the inlet chamber and outlet chamber being separated by a dividing wall. The bore and the at least one gas supply passage may be formed through the dividing wall.

In embodiments of the above, the outlet chamber may have a larger diameter that the inlet chamber, and the at least one gas supply passage may be angled outwardly from the inlet chamber to the outlet chamber.

In embodiments of any of the above, the at least one gas passage may have an inlet and an outlet. The inlet to the at least one gas passage may be in a side wall of the inlet chamber and the outlet to the at least one gas passage may be in a bottom wall of the outlet chamber.

In embodiments of any of the above, the bottom surface of the membrane support element may be concavely dished. This may assist in retaining the ruptured membrane thereon.

In embodiments of any of the above, the valve may further comprise an actuator coupled to the membrane support element and retractable to permit retraction of the membrane support element.

The actuator may be retained in a position in which it engages the membrane support element by a retaining element which is releasable to allow the membrane support element to move from its extended position to its retracted position.

The retaining element may, in various embodiments be a pivotally mounted element. The retaining element may be spring biased towards the released position of the retaining element.

The retaining element may, in various embodiments, be released by a release element which may, for example, be pivotally mounted and which may, for example be released by a user pulling on a lanyard coupled to the release element.

In various embodiments, the actuator may be mounted within a bore of the membrane support element.

In embodiments of any of the above, the membrane support element may be resiliently biased towards the rupturable membrane.

In embodiments of any of the above, the valve body may comprise a stop with which the membrane support element is engageable in the retracted position. This may assist in accurately positioning the bottom end of the membrane support element within the bore.

In embodiments of any of the above, the valve body may comprise a stop with which the membrane support element is engageable in the extended position. This may assist in accurately positioning the bottom end of the membrane support element in contact with the rupturable membrane.

In embodiments of any of the above, the gas inlet may be arranged at the base of a recess provided in the valve body and the valve may further comprise an annular retaining ring mounted in the recess for retaining the membrane in the recess.

The disclosure also provides an inflation system comprising a source of inflation gas, for example a pressurised gas cylinder, and a pneumatic valve in accordance with the disclosure mounted in fluid communication with the source, for example to a neck of the pressurised gas cylinder.

The disclosure also provides a method of retaining a rupturable membrane in a pneumatic valve, comprising retracting a membrane support element through a bore to release the membrane, but maintaining a lower end of the membrane support element in the bore such that the ruptured membrane is received within and cannot pass through the bore.

BRIEF DESCRIPTION OF DRAWINGS

An embodiment of the disclosure will now be described, by way of example only, with reference to the accompanying drawings in which.

DETAILED DISCRIPTION

Figure 1:
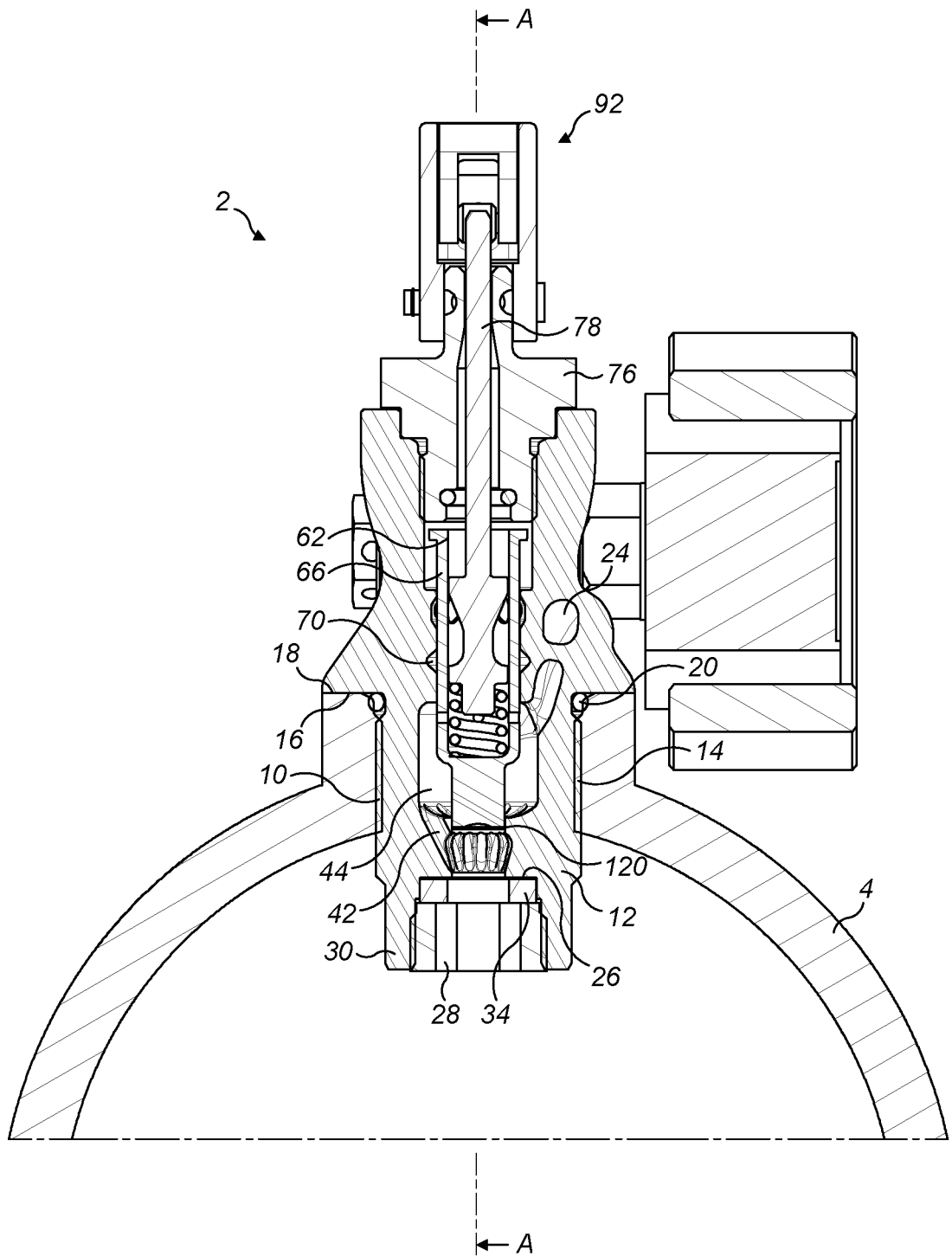
FIG. 1 shows a vertical cross section of an inflation system incorporating a pneumatic valve in accordance with the disclosure in an open configuration.

With reference to FIG. 1, an inflation system 2 comprises a source 4 of high pressure gas (for example carbon dioxide), a pneumatic valve 6 and a connector 8 for connecting to a device such as an evacuation slide which requires inflation. A pressure regulation valve (not shown) may be provided in or coupled to the connector 8.

In this embodiment, the source 4 of high pressure gas is a pressurised cylinder having a threaded neck 10 which receives the pneumatic valve 6.

The pneumatic valve 6 comprises a valve body 12. In this embodiment, the valve body is a one-piece body which may be made, for example, by additive manufacturing or casting. Additive manufacturing is particularly advantageous as it will allow intricately shaped passages and features to be manufactured simply. In other embodiments, however, the valve body 12 may be constructed from a plurality of components suitably joined together.

The valve body 12 comprises a threaded outer surface 14 for threaded engagement with the threaded neck 10 of the pressurised gas cylinder 4. The valve body 12 further comprises an outer shoulder 16 which axially engages the upper end 18 of the threaded neck 10 of the pressurised gas cylinder 4. A seal, for example an O-ring seal 20 is arranged between the valve body 12 and the threaded neck 10 of the pressurised gas cylinder 4 to prevent escape of pressurised gas from around the valve body 12.

The valve body 12 further comprises a gas inlet 22 and a gas outlet 24. The gas inlet 22 is arranged at the base 26 of a recess 28 provided in the bottom end 30 of the valve body 12. A rupturable membrane 32 is retained in the base 26 of the recess 28 across the gas inlet 22 by means of a retaining ring 34 which is mounted, for example threadedly mounted or press fitted, into the recess 28. The membrane 32 may be made from a material such as aluminum, as is known in the art. The radially outer portion 35 of the rupturable membrane 32 is clamped against the base 26 of the recess 28 by the retaining ring 34.

The valve body 12 further comprises an inlet chamber 38 in fluid communication with the gas inlet 22 and an outlet chamber 40 in fluid communication with the gas outlet 24. The inlet chamber 36 and outlet chamber 38 are separated by a dividing wall 42 which extends across an internal cavity 44 defined in the valve body 12.

Figure 3:
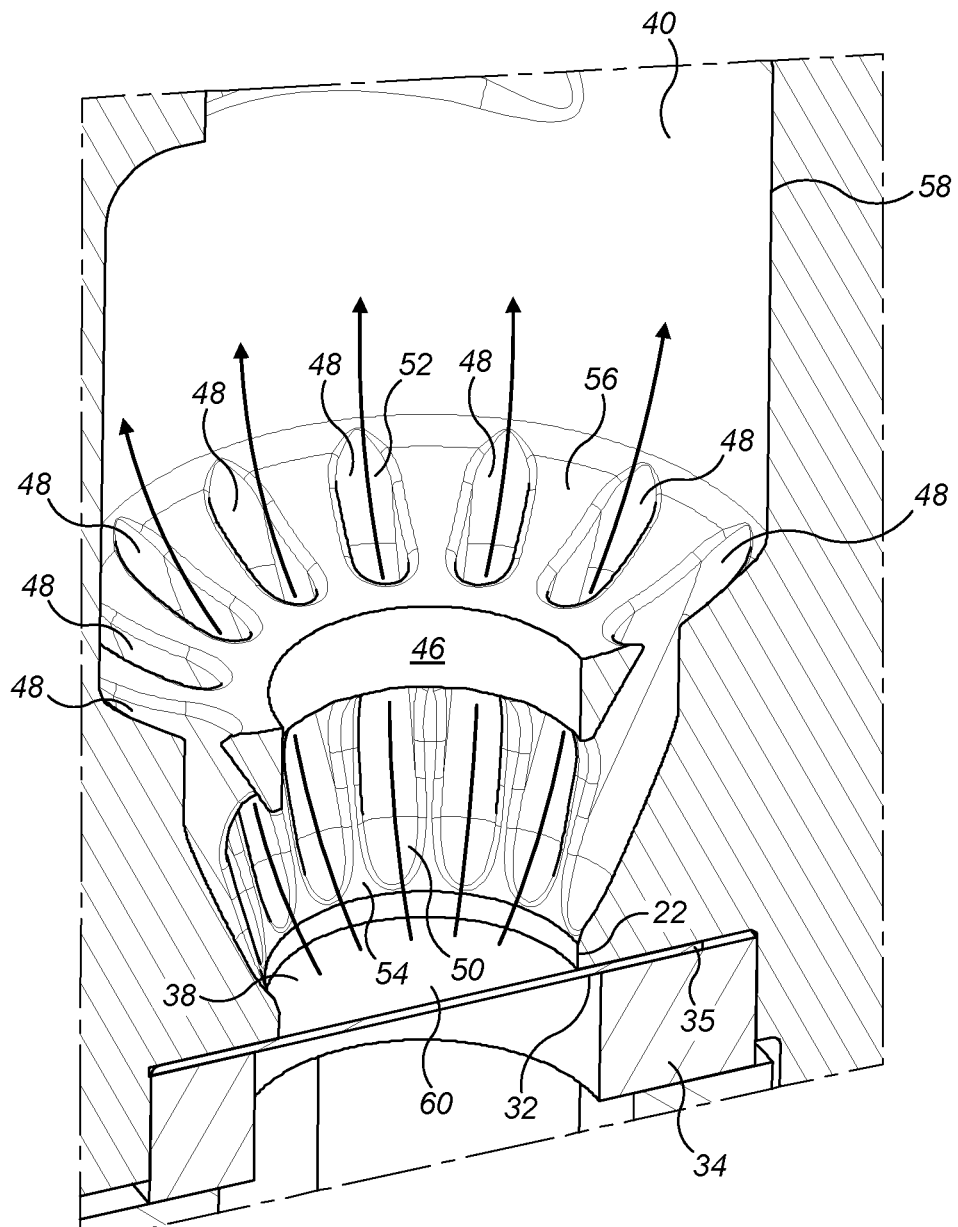
FIG. 3 shows a further detail of the pneumatic valve illustrated in FIG. 1.

The dividing wall 42 is formed with a central bore 46 and with a plurality of gas supply passages 48 arranged around and bypassing the bore 46. The gas supply passages 48 provide a gas flow path (indicated by the arrows in FIG. 3) from the gas inlet 22 to the gas outlet 24. In this embodiment, there are fourteen (14) gas supply passages 48 arranged about the bore 46. The gas supply passages 48 are equi-spaced circumferentially about the bore 46. In other embodiments, the number of gas supply passages 48 and their configuration may differ.

The number and configuration of the gas supply passages 48 should be sufficient to deliver the required flow of inflating gas through the valve 6. The total cross-sectional flow area of the gas supply passages 48 is advantageously greater than the cross-sectional area of the inlet 22. This will avoid the gas supply passages 48 creating a restriction to the flow of gas from the inlet 22 to the outlet 24.

Figure 2:
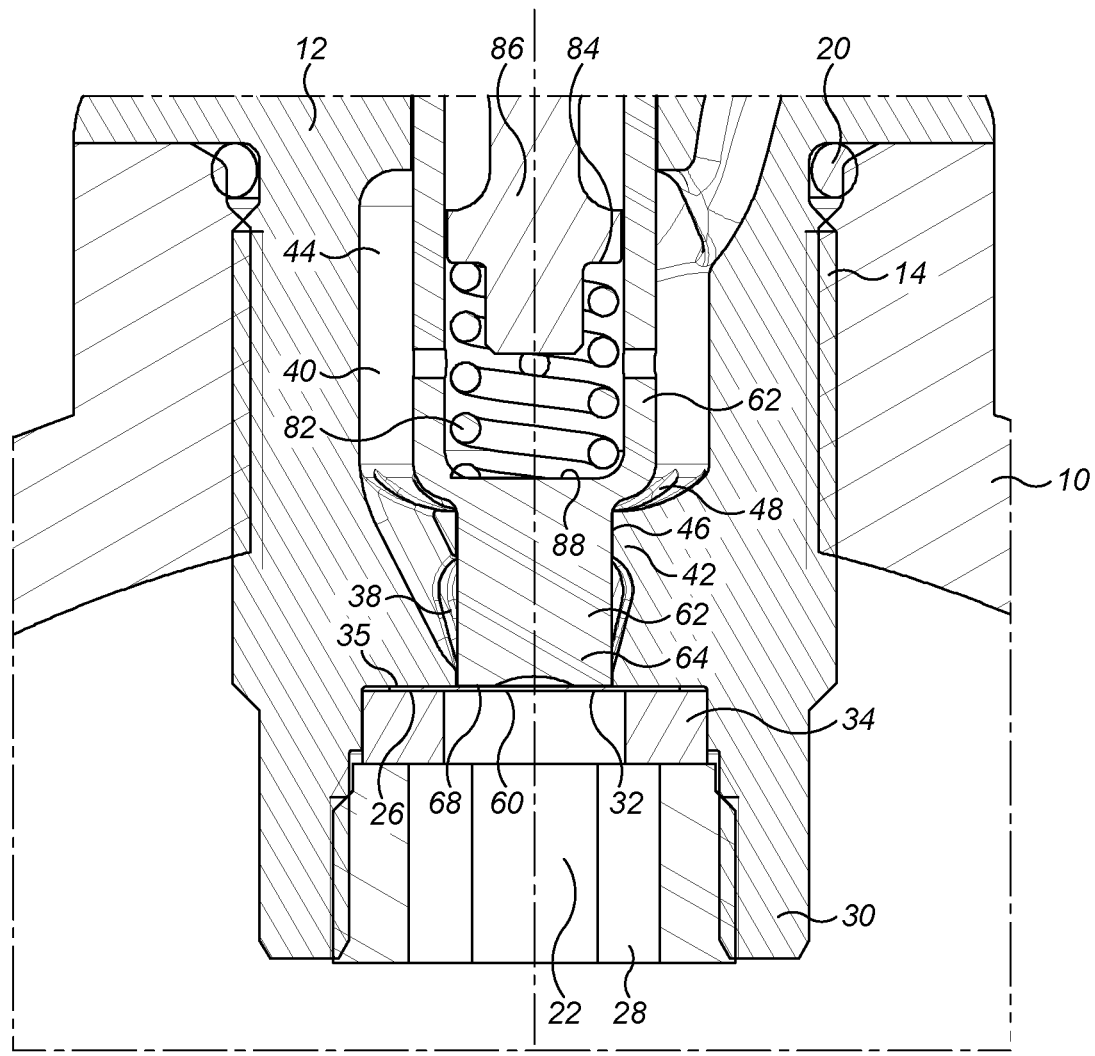
FIG. 2 shows a detail of the pneumatic valve illustrated in FIG. 1.

As can be seen for example from FIG. 2, the outlet chamber 40 has a larger diameter than the inlet chamber 38. Accordingly, the gas supply passages 48 are angled outwardly from the inlet chamber 38 to the outlet chamber 40.

Each gas supply passage 48 has an inlet 50 and an outlet 52. The inlet 50 to the gas supply passage 48 is formed in a side wall 54 of the inlet chamber 38 and the outlet 52 to the gas supply passage 48 is formed in a bottom wall 56 of the outlet chamber 40. Of course, the positions of the inlets 50 and outlets 52 may vary in other embodiments.

In this embodiment, each gas supply passage 48 extends adjacent the side wall 58 of the outlet chamber 40. The gas supply passage 48 may, as shown be generally straight, although as shown, it may turn at its outlet 52 so as to direct the gas flow more tangentially to the side wall 58 of the outlet chamber 40.

It will be noted that the inlet 52 each gas supply passage 48 is smaller than the central region 60 of the rupturable membrane 32 which will separate after operation of the valve 6. This will, as will be described further below, prevent the ruptured membrane 32 entering and potentially passing through the gas supply passage 48.

The valve 2 further comprises a membrane support element 62 which is slidably mounted within the valve body 12 for movement between a retracted position shown in FIG. 1 and an extended position shown in FIG. 2. The membrane support element 62 has a cylindrical lower end 64 and a hollow upper end 66.

As shown in FIG. 2, in the extended position of the membrane support element 62, the lower surface 68 of the lower end 64 of the membrane support element 62 engages the central region 60 of the rupturable membrane 32. The lower end surface 68 of the membrane support element 62 may, as illustrated, be concavely dished in some embodiments. The lower end 64 of the membrane support element 62 is received with a sliding fit within the gas inlet 22.

The lower end 64 of the membrane support element 62 slidably extends through the bore 46 formed in the dividing wall 42 of the valve body 12. The upper end 66 of the membrane support element 62 is slidably received in an upper bore 70 of the valve body 12. The upper end 66 of the membrane support element 62 is provided with a radially outwardly flange 72 which is engageable with a shoulder 74 formed atop the upper bore 70 of the valve body 12, thereby limiting the downward motion of the membrane support element 62. An annular plug 76 is mounted, for example threadedly mounted, in the upper end 78 of the upper bore 70. The flange 72 of the membrane support element 62 is also engageable with the plug 76 thereby limiting the upward motion of the membrane support element 62.

An actuator 78 is slidably mounted within a bore 80 defined in the hollow upper end 66 of the membrane support element 62. A spring 82 is located between a shoulder 84 defined at the lower end 86 of the actuator 78 and the bottom 88 of the bore 80. The spring 82 biases the membrane support element 62 in a downward direction such that in the extended position, the flange 72 of the membrane support element 62 engages the shoulder 74 of the valve body 12 and positions the lower surface 68 of the membrane support element 62 in contact with, or closely adjacent to, the rupturable membrane 32.

The actuator 78 is coupled at its upper end 90 to a control mechanism 92 which is operable to retract the actuator 78 when it is desired to operate the inflation system.

Figure 4:
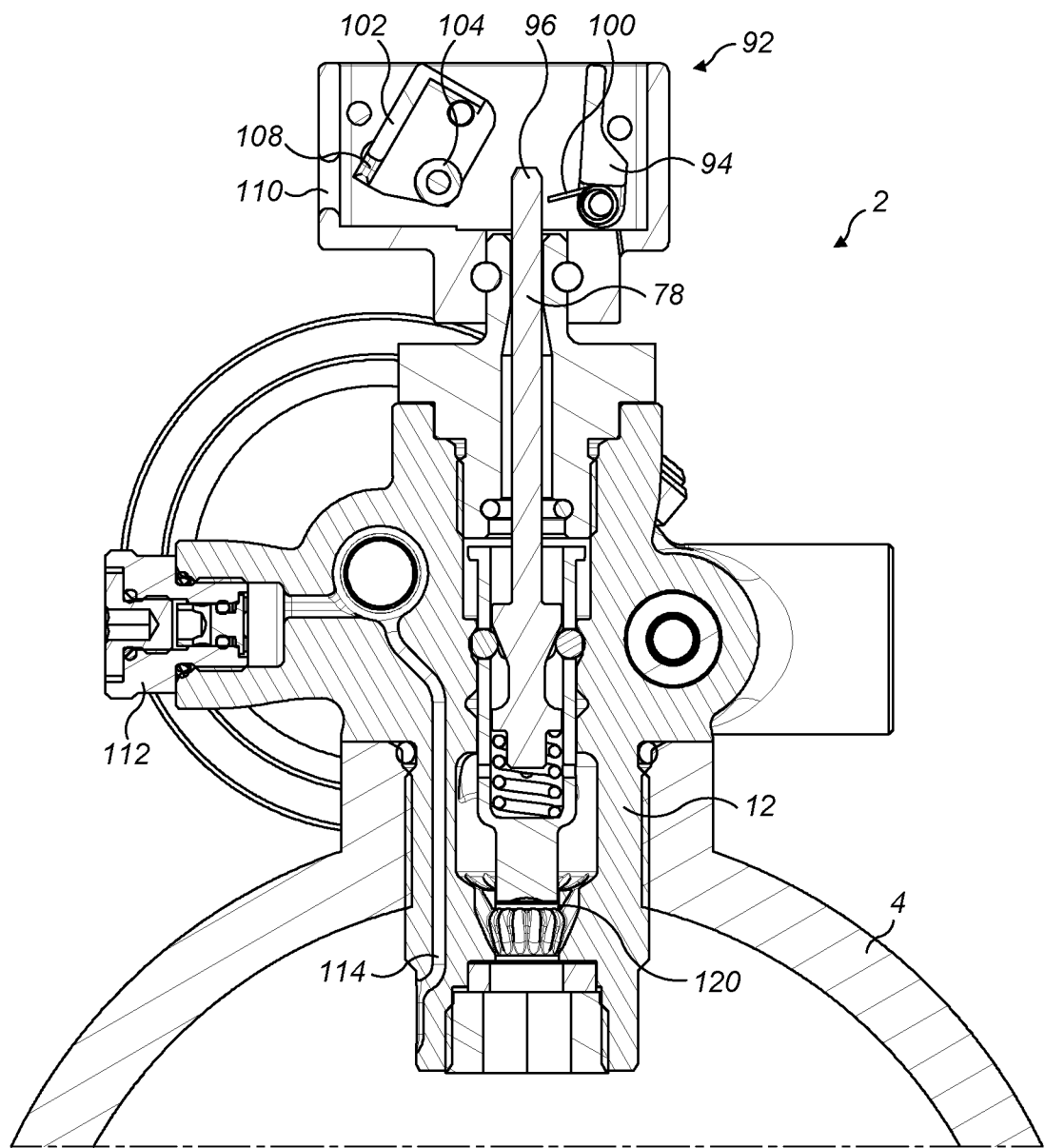
FIG. 4 shows a further cross sectional view of the inflation system of FIG. 1 taken along line A-A of FIG. 1, with the pneumatic valve in an open configuration.
Figure 5:
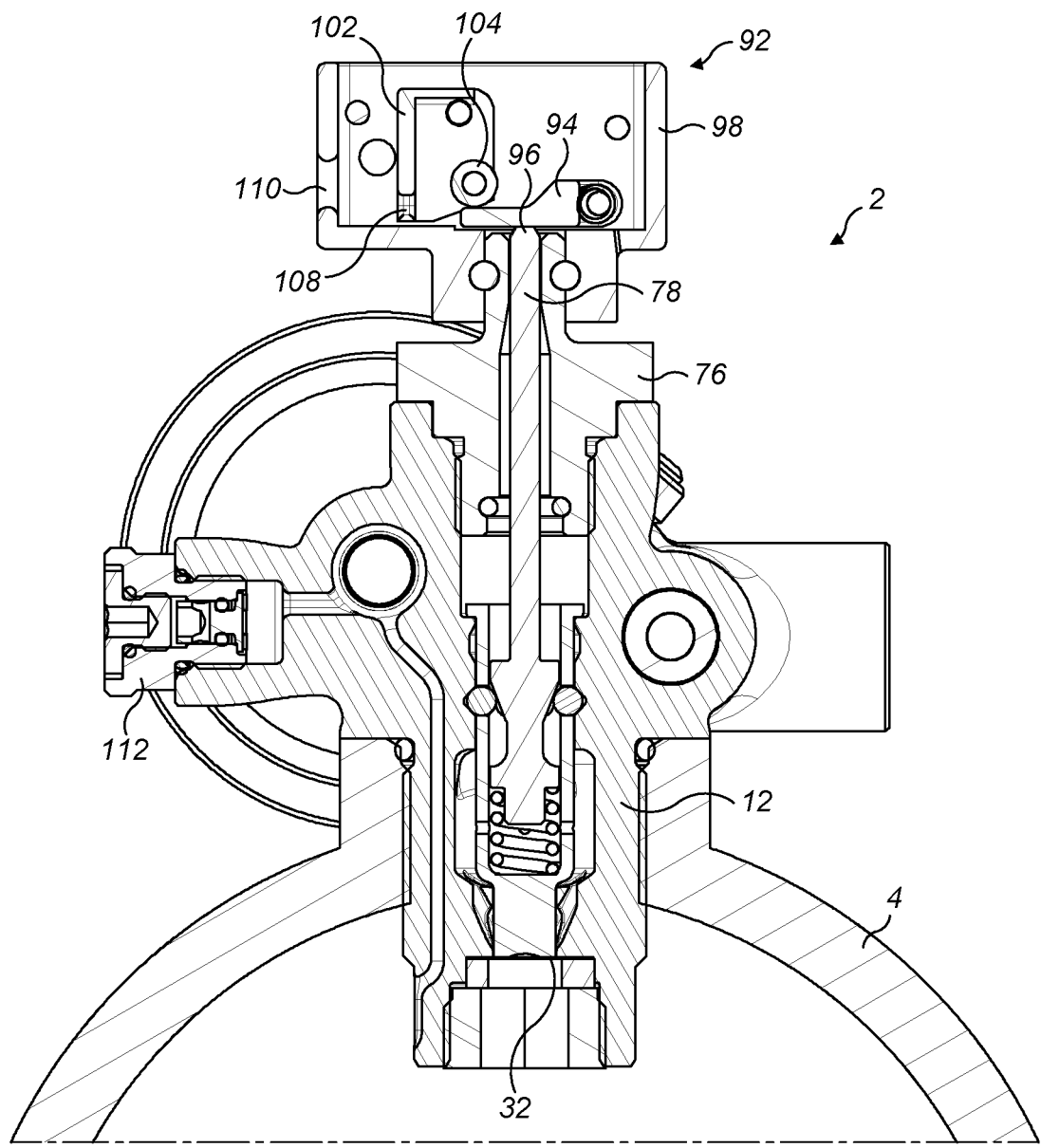
FIG. 5 shows a vertical cross sectional view of the inflation system of FIG. 1 along the line A-A, but with the pneumatic valve in a closed configuration.

Referring to FIGS. 4 and 5, the control mechanism comprises a pivotally mounted retaining element 94 which, when the valve 2 is in its closed configuration, abuts the upper end 96 of the actuator 78. The retaining element 94 is mounted in a housing 98 mounted atop the plug 76 in this embodiment. The retaining element 94 may, as shown, be spring loaded by a spring 100 so as to rotate in a direction away from the actuator 78. The retaining element 94 is retained in its "closed" position as shown in FIG. 5 by a pivotally mounted, L-shaped release element 102 which, as shown in this embodiment, may have a roller 104 engaging an upper surface 106 of the retaining element 94. A lanyard (not shown) with a ball at one end is received in an opening 108 of the release element 102 and extends out through an opening 110 in the housing 98. The lanyard may be pulled so as to rotate the release member 102 and thereby disengage roller 104 from the retaining element 94 allowing it to pivot under the force of the spring 104 and under the force applied by the actuator 78, thereby allowing the actuator to move upwardly to the "open" position shown in FIG. 4.

Having described the construction of the valve 6, its method of operation will now be described.

As discussed above, the valve 6 is mounted in the neck 10 of a high pressure gas cylinder 4. Typically the gas within the cylinder 4 will be at very high pressure, for example 3300 psi. The valve 6 is preassembled and mounted into the cylinder neck 10. Gas is filled into the cylinder via a non-return filling valve 112 shown in FIGS. 4 and 5 after the valve 6 has been fitted. The non-return valve 112 is mounted in the valve body 12 which has a filling passage 114 which bypasses the gas supply passages 48 and bore 46.

In the normal, inoperative condition of the valve 6, the actuator 78 and membrane support element 62 are arranged in their extended positions, as shown in FIGS. 2 and 5. In this condition, the central region 60 of the membrane 32, which is subject to the high pressure of the gas in the cylinder 4, will be pressed into firm contact with the bottom surface 68 of the membrane support element 62. It is not necessary for the bottom surface 68 of the membrane support element 62 to touch the membrane 32 prior to assembly of the valve 6 to the cylinder 4. Provided the lower surface 68 is arranged closely adjacent to the membrane 32, the membrane 32 may be deformed slightly into contact with the bottom surface 68 of the membrane support element 62 without rupturing the membrane 32. The downward force exerted on the membrane support element 62 by the actuator 78 and spring 82 counteracts the upward force exerted on the membrane 32 by the high pressure gas, thereby preventing the membrane 32 rupturing. In this condition, there is no flow from the cylinder 4 into the valve 6.

When it is desired to initiate inflation of the device, the control mechanism 92 is operated, by pulling on its lanyard to release the actuator 78 and allow it to retract to the position shown in FIGS. 1 and 4. Retraction of the actuator 78 removes or reduces the downward force exerted on the membrane support element 62, such that the force the membrane support element 62 exerts on the membrane 32 is insufficient to counteract the upward force exerted on the membrane 32 by the high pressure gas in the gas cylinder 4. The membrane 32 will then rupture and the central region 60 thereof detach from the radially outer portion 35 thereof. The high pressure gas escaping from the gas cylinder 4 continues to press the central region 60 of the membrane 32 against the bottom surface 68 of the membrane support element 62, meaning that the detached central region 60 will move upwardly with the membrane support element 62. The concave shape of the bottom surface 68 of the membrane support element 62 may assist in retention of the detached portion 60 on the membrane support element 62.

The membrane support element 62 will move upwardly to the position shown in FIGS. 1 and 4 in which the flange 72 at the upper end 66 of the membrane support element 62 comes into contact with the plug 76. In this position, as can be seen most clearly in FIG. 1, the lower end 64 of the membrane support element 62 is still located within the bore 46 of the dividing wall 42. The bottom surface 68 of the membrane support element 62 and the wall of the bore 66 define a pocket 120 for receiving the detached central region 60 of the membrane 32. The detached region 60 of the membrane 32 will be pushed into the pocket 120 by the pressure of gas escaping from the cylinder 4, so that the detached region 60 will be retained in the pocket 120.

Retraction of the membrane support element 62 allows flow of inflating gas from the gas inlet 22 to the gas outlet 24 via the gas supply passages 48. As discussed above, as the total flow area of the gas supply passages 48 advantageously may be greater than that of the gas inlet 22, the gas supply passages 48 do not inhibit gas flow through the valve 6. In fact, the total flow area of the gas supply passages 48 may be significantly greater, for example 10% greater than that of the gas inlet such that blockage of one or more gas supply passages 48 by the detached region 60 of the membrane 32 will not adversely affect the flow of gas through the valve 6.

Moreover, as the inlet 52 of each gas supply passage 48 may be smaller than the central region 60 of the rupturable membrane 32, should for some reason the detached region 60 of the membrane 32 separate from the membrane support element 62, it will not be able to pass through the gas supply passage 48 and flow further downstream where it might potentially cause a blockage or damage. The location of the lower end 64 of the membrane support element 62 in the bore 46 prevents the detached membrane region 60 from entering the gas flow path via that bore 46.

It will be seen from the above that in its various embodiments, the disclosure provides a pneumatic valve for use in an inflation system incorporating a rupturable membrane which reduces the risk of the ruptured membrane passing through the valve and into the downstream flow where it may, for example, cause a blockage or damage.

It will be appreciated that the description is of a non-limiting embodiment of the disclosure and that modifications may be made thereto without departing from the scope of the disclosure.

The invention claimed is:

1. A pneumatic valve for attachment to a source of high pressure gas, the pneumatic valve comprising: a valve body comprising a gas inlet in fluid communication with an inlet chamber and a gas outlet in fluid communication with an outlet chamber; a rupturable membrane extending across the gas inlet; a membrane support element slidably supported in the valve body for movement between an extended position and a retracted position, the membrane support element having a lower end engageable, in the extended position, with the rupturable membrane to support the rupturable membrane against rupture; the valve body comprising a bore located between the gas inlet and the gas outlet, the membrane support element extending through the bore and one or more gas supply passages extending from the inlet chamber to the outlet chamber bypassing the bore for providing a gas flow path from the gas inlet to the gas outlet; and the membrane support element being configured to be movable from the extended position to the retracted position to permit the rupturable membrane to rupture under the pressure of the high pressure gas, the lower end of the membrane support element in the retracted position being positioned within the bore whereby the lower end of the membrane support element and the bore together form a pocket for receiving a ruptured portion of the rupturable membrane.

2. A pneumatic valve as claimed in claim 1, wherein the one or more gas supply passages are arranged around the bore.

3. A pneumatic valve as claimed in claim 1, wherein the total cross sectional flow area of the one or more gas supply passages is greater than the cross sectional flow area of the gas inlet.

4. A pneumatic valve as claimed in claim 1, wherein the inlet chamber and outlet chamber are separated by a dividing wall, the bore and the one or more gas supply passages are formed through the dividing wall.

5. A pneumatic valve as claimed in claim 4, wherein the outlet chamber has a larger diameter that the inlet chamber, and the one or more gas supply passages is angled outwardly from the inlet chamber to the outlet chamber.

6. A pneumatic valve as claimed in claim 4, wherein the one or more gas supply passages has an inlet and an outlet, the inlet to the one or more gas supply passages being in a side wall of the inlet chamber and the outlet to the at least one gas passage being in a bottom wall of the outlet chamber.

7. A pneumatic valve as claimed in claim 1, wherein the bottom surface of the membrane support element is concavely dished.

8. A pneumatic valve as claimed in claim 1, further comprising an actuator coupled to the membrane support element and retractable to permit retraction of the membrane support element.

9. A pneumatic valve as claimed in claim 8, wherein the actuator is mounted within a bore of the membrane support element.

10. A pneumatic valve as claimed in claim 1, wherein the membrane support element is resiliently biased towards the rupturable membrane.

11. A pneumatic valve as claimed in claim 1, wherein the valve body comprises a stop with which the membrane support element is engageable in the retracted position.

12. A pneumatic valve as claimed in claim 1, wherein the valve body comprises a stop with which the membrane support element is engageable in the extended position.

13. A pneumatic valve as claimed in claim 1, wherein the gas inlet is arranged at the base of a recess provided in the valve body, the valve further comprising an annular retaining ring mounted in the recess for retaining the membrane in the recess.

14. An inflation system comprising: a source of inflation gas; and a pneumatic valve as claimed in claim 1, the pneumatic valve being mounted in fluid communication with the source.

15. The inflation system of claim 14, wherein the source of inflation gas is a pressurized gas cylinder.

16. A method of retaining a rupturable membrane, comprising: a pneumatic valve as recited in claim 1; retracting the membrane support element through the bore to release the rupturable membrane, while maintaining the lower end of the membrane support element in the bore such that the ruptured membrane is received within and cannot pass through the bore.

* * * * *